United States Patent
Oliinyk et al.

(10) Patent No.: US 12,346,805 B2
(45) Date of Patent: Jul. 1, 2025

(54) METHODS FOR CONVERTING HIERARCHICAL DATA

(71) Applicant: Cylance Inc., San Ramon, CA (US)

(72) Inventors: Yaroslav Oliinyk, Portland, OR (US); David Neill Beveridge, Portland, OR (US); David Michael Liebson, Portland, OR (US); Lichun Lily Jia, Austin, TX (US); Eric Glen Petersen, Beaverton, OR (US)

(73) Assignee: BlackBerry Corporation, Wilmington, DE (US)

( * ) Notice: Subject to any disclaimer, the term of this patent is extended or adjusted under 35 U.S.C. 154(b) by 1050 days.

(21) Appl. No.: 17/351,018

(22) Filed: Jun. 17, 2021

(65) Prior Publication Data

US 2022/0405572 A1    Dec. 22, 2022

(51) Int. Cl.
   *G06N 3/08*     (2023.01)
   *G06F 16/28*    (2019.01)
   *G06F 16/901*   (2019.01)
   *G06F 18/214*   (2023.01)
   *G06N 5/04*     (2023.01)
   *H04L 9/32*     (2006.01)

(52) U.S. Cl.
   CPC ............ *G06N 3/08* (2013.01); *G06F 16/282* (2019.01); *G06F 16/9027* (2019.01); *G06F 18/214* (2023.01); *G06N 5/04* (2013.01); *H04L 9/3236* (2013.01)

(58) Field of Classification Search
   None
   See application file for complete search history.

(56) References Cited

U.S. PATENT DOCUMENTS 10,528,731 B1   1/2020  Syme et al.
2021/0056211 A1 2/2021  Olson et al.

FOREIGN PATENT DOCUMENTS

CN    107516041    12/2017

OTHER PUBLICATIONS

Karpathy, Connecting Images and Natural Language, Stanford University, Doctoral Thesis, Aug. 2016, pp. 1-95 (Year: 2016).*
Office Action in European Appln. No. 22172167.3, mailed on Nov. 25, 2024, 6 pages.
Extended European Search Report in European Appln. No. 22172167.3, dated Oct. 14, 2022, 8 pages.

* cited by examiner

*Primary Examiner* — Wilbert L Starks
(74) *Attorney, Agent, or Firm* — Fish & Richardson P.C.

(57) ABSTRACT

Systems, methods, and software can be used for securing in-tunnel messages. One example of a method includes obtaining a parsed file that comprises two or more sub-feature trees, and each of the two or more sub-feature trees comprise at least one feature layer that comprises features. The method further includes generating a feature vector that identifies the features in the at least one feature layer for each of the two or more sub-feature trees. The method yet further includes mapping the features in the at least one feature layer for each of the one or more sub-feature trees to a corresponding position in the feature vector. By converting features in the parsed file into a feature vector, the method provides an applicable format of the feature vector in wide applications for the parsed file.

15 Claims, 5 Drawing Sheets

METHODS FOR CONVERTING HIERARCHICAL DATA

TECHNICAL FIELD

The present disclosure relates to a method for converting hierarchical data into a neural network.

BACKGROUND

In some cases, an operating system needs to process many software samples whose structure is defined by a set of rules. The structure may have extensive variabilities. These software samples include many features which may not be recognizable or discoverable automatically by a neural net.

BRIEF DESCRIPTION OF DRAWINGS

Like reference numbers and designations in the various drawings indicate like elements.

DETAILED DESCRIPTION

In some cases, an operating system executing on an endpoint or a server can process a parsed file, e.g., a portable executable file. The parsed file includes hierarchical data which is represented as a feature tree. The feature tree of the parsed file has multiple sub-feature trees, and all features of the parsed file would trace back to one common root. In some cases, the parsed file often includes another parsed file in the hierarchical structure whose feature tree would be one sub-feature tree or one leaf node of the main feature tree. When the operating system processes the parsed file and represents its hierarchical data into a standard neural network, the format/command of the hierarchical data might be represented differently. In terms of execution, a new nested hierarchical data, e.g., the order of LoadCommand, can cause a problematic issue during execution. In order to solve the issues generated during feeding the parsed files into a neural network and improve the adaptation to arbitrary hierarchical data, the present disclosure provides a method of converting hierarchical data of parsed files for a standard neural network, and furthermore improves computer performance, e.g., an efficient runtime of constructing feature tag for all features in any hierarchical position, in the operating system.

The present disclosure provides a method that delayers/de-hierarchizes hierarchical data of a file, strips the order from a certain sub-feature trees of the file, enforces the order in the rest sub-features of the file, and nests the features into another structure. For example, a method of converting hierarchical data includes "flattening" the features from the feature tree of the parsed file and mapping the features to a feature vector, such that the feature vector can be a uniform across all features of unknown/arbitrary hierarchical position in the feature tree as an index of features in neural networks. Furthermore, the feature vector of the present application can be applied to neural networks, especially non-convolutional neural networks, to help them properly understand, train and score features that are inherently structured/hierarchical in the files. These features are inherently structured due to the files having a certain structure as defined by format specifications and implementation details. As non-convolutional neural networks do not understand how to process structured/hierarchical features and convolutional neural networks cannot process an unpredictable hierarchy effectively, the flat/2D feature vector of the present application can be understood by neural networks and improve runtime when processing structured features. The feature vector techniques will be described in greater detail below, with reference to FIGS. 1 to 5.

Figure 1:
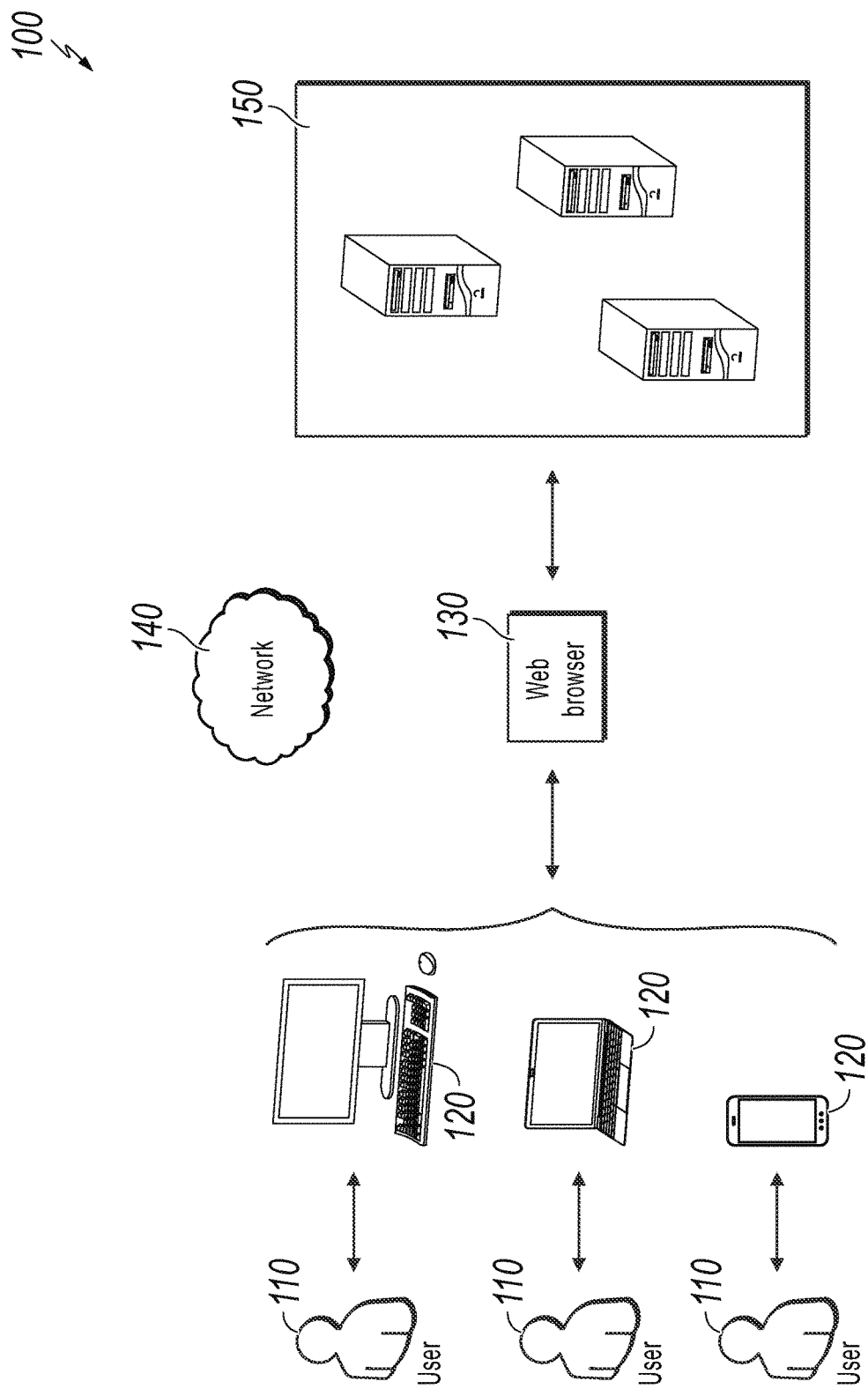
FIG. 1 is a diagram showing an example system for converting hierarchical data to establish a feature vector, according to an implementation.

FIG. 1 is an example system 100 for converting hierarchical data to establish a feature vector, according to an implementation. At a high level, the example system 100 includes one or more user devices 120, a network 140, and one or more servers 150. A user 110 may use the user device 120 to download a file, e.g., a portable executable file, via a web browser 130 over the network 140, or use the user device 120 to communicate with the server 150 through the network 140. In general, the user device 120 and the server 150 can be implemented to establish a feature vector for files including hierarchical data.

In one example, the user device 120 and the server 150 may process a file which includes hierarchical data to identity features. For example, the user device 120 and/or the server 150 can pre-process a file, identify features from a tree-like data structure, and establish a flat, sparse feature vector to indicate identified features. The established feature vector can be read/recognized by different modules or operating environments. In some cases, the feature vector can be fed to a machine learning model which can be trained to automatically recognize and process the features from the files. The processing steps and use cases of the feature vector will be described in greater detail below, with reference to FIG. 2.

Turning to a general description, a user device, e.g., the user devices 120, may include, without limitation, any of the following: computing device, mobile electronic device, user device, mobile station, subscriber station, portable electronic device, mobile communications device, wireless modem, wireless terminal, television, printer or other peripheral, vehicle, or any other electronic device capable of sending and receiving data. Examples of a mobile device may include, without limitation, a cellular phone, personal data assistant (PDA), smart phone, laptop, tablet, personal computer (PC), pager, portable computer, portable gaming device, wearable electronic device, health/medical/fitness device, camera, or other mobile communications devices having components for communicating voice or data via a wireless communication network. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used synonymously herein.

Network 140 includes any suitable networks operable to support communication between components of system 100. Network 140 may include any type of wired or wireless communication channel capable of coupling together computing nodes. Network 140 may include any interconnecting system capable of transmitting audio, video, electrical signals, optical signals, data, messages, or any combination of the preceding. Network 140 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 100. Network 140 may be configured to support any communication protocols as would be appreciated by one of ordinary skill in the art upon viewing this disclosure.

Servers 150 include any suitable storage scheme including any software, hardware, firmware, and/or combination thereof capable of storing and processing information. Example servers 150 include individual data storage devices (e.g., memory, disks, solid-state drives), which may be part of individual storage engines and/or may be separate entities coupled to storage engines. Servers 150 may store third-party databases, database management systems, a file system, and/or other entities that include or that manage data repositories.

Figure 2:
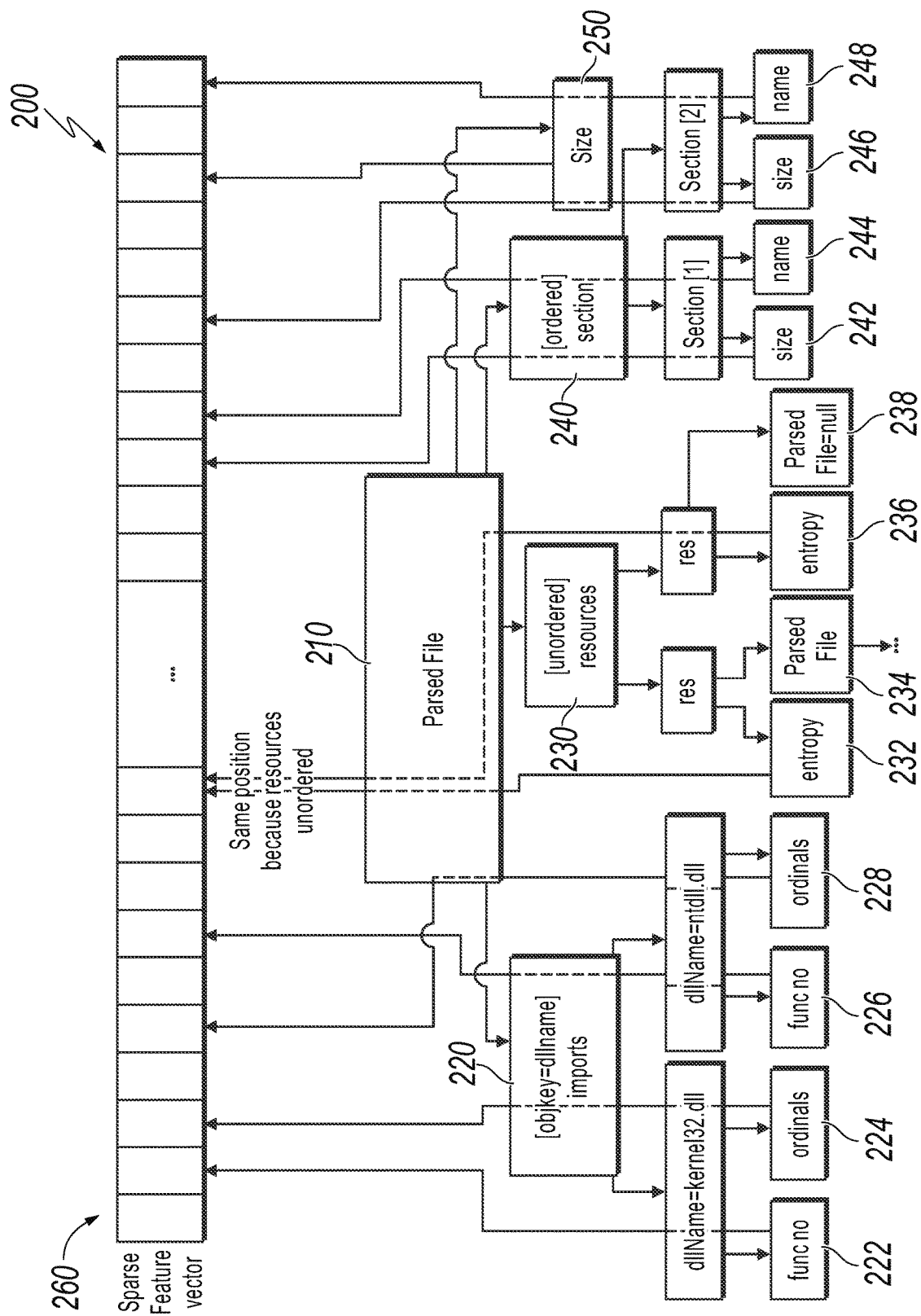
FIG. 2 is a diagram showing an example operating system for converting hierarchical data to establish a feature vector which includes features from the hierarchical data, according to an implementation.

FIG. 2 is an example operating system 200 for converting hierarchical data to establish a feature vector, according to an implementation. The operating system 200 executes on an endpoint or a server, e.g., the user device 120 and the server 150 disclosed in FIG. 1. The operating system 200 receives a parsed file 210 which includes sub-feature trees. In some cases, the parsed file 210 comprises multiple sub-feature trees, e.g., imports 220, resources 230, section 240, and size 250, and each sub-feature trees comprises its features. For example, a sub-feature tree of the imports 220 includes kernel32.dll and ntdll.dll at a first layer, and kernel32.dll includes features, e.g., function number 222 and ordinals 224, and ntdll.dll includes features, e.g., function number 226 and ordinals 228. Likewise, a sub-feature tree of the resources 230 includes features, e.g., entropy 232, a parsed file 234, entropy 236, and a parsed file 238, and a sub-feature tree of the section 240 includes features, e.g., size 242, name 244, size 246, and size 248. In some cases, the parsed file 234 may include its own sub-feature trees, and the parsed file 238 may be marked as null. For example, if the parsed file 210 includes the parsed file 234 as its second resource which in turn includes an NSIS installer structure with first resource being encrypted with entropy, and the entropy (e.g., the entropy 232) is also identified as a feature.

In some cases, OrderedArray and ObjectKey can be applied to identify/select features in the parsed file 210. OrderedArray and ObjectKey specifically handle certain collections (arrays) of features that should be treated as distinct and to avoid feature clobbering. For example, OrderedArray and ObjectKey can process certain features which should be clobbered (e.g. brightness of an array of pixels based on certain criteria, such as minimum of brightness, maximum of brightness, average of brightness, and/or median of brightness) and avoid processing other features which should not be clobbered, e.g., CPU model numbers across different MO images in fat or multiarchitecture files. Furthermore, ObjectKey and OrderedArray give meaning to groups of features based on a feature value or array position. In some cases, the feature value may be a type of load command which can be used as a defining feature for treatment of other load command properties, such that the same type of load command across different software samples can be applied in a comparison. In some cases, an array position is defined by OrderedArray, so that the first image in a list can be used to compare to another first image from a different software sample. In addition, OrderedArray and ObjectKey can preserve information when flattening arrays of structured data objects. In some cases, ObjectKey allows an arbitrary member of the parsed file 210 to become part of the feature name. In some cases, OrderedArray allows an array index of the parsed file 210 to become part of the feature name.

As the features of the parsed file 210 are de-layered and identified, a feature vector 260 is established and mapped with the identified features. Each feature of the parsed file 210 includes a feature identity which can be used to determine a position of the feature in the feature vector 260. Furthermore, the feature identity can also be a feature index of the feature vector to locate a specific feature. In some cases, a nested feature (e.g. the size 250) may have a different position in the feature vector 260 based on other features of enclosing objects (e.g., the parsed file 210). In some cases, a nested feature may be mapped to a different position in the feature vector 260 based on a position of the enclosing parsed file in a collection of software samples. In some cases, the position of the enclosing parsed file can be disregarded. In addition to position, feature meaning may also depend on a trait of the parsed file 210 in a sequence. For example, when feeding the number of the imports 220 from different modules in training a machine learning model, a trait of the parsed file 210 may be the name of the module. In other words, a feature of the sub-feature tree can be mapped to different hash values based on value of one pre-defined node in such sub-feature tree.

In some cases, the feature vector 260 is generated as identifying the features in the parsed file 210, instead of separated steps. Every feature that can be represented as e.g. PEFile.resources [2].nsisInfo.opcodes[9]==10 is immediately produced as a single unsigned integer 64 bit (uint64) value which is similar to a hash value. The uint64 value can be used as an index in the feature vector 260. By using the uint64 value of each feature, the model can recognize a specific feature from a malware sample.

While the overall hierarchy is unpredictable, there are rules that are building blocks for the hierarchy, e.g., C# classes. For example, a pseudocode of an example parsed file can be represented as follow:

```
class ParsedFile
{
int size; // continuous, id: a0033bef6a58afb3
List<Resource> resources; // unordered, id: 72005311637f58b5
List<Section> section; // ordered, id: 80ad722851da2f00
List<Import> imports; // objectkey(dllName), id: ba7db79509a17f51
}
class Resource
{
double entropy; // continuous, id: 2a6ed820caf5efeb
ParsedFile; // id: 27bd2ce994454630
string[ ] strings; // unordered, id: 5ede502e9eaaaf52
NsisInfo; // id: 90c42c04143b0ef7
}
class NsisInfo
{
int[ ] opcodes; // categorical, ordered, id: 0dc1ad60919ad27e
string name; // id: 9810efc12c5e41c6
}
class Import
{ string dllName; // categorical, id: 517490a06580772f
```

```
bool ordinalImportsPresent; // categorical, id: d7902b70646afc9d
int numberOfFunctions; // continuous, id: d5f80b084e9780ae
}
```

Furthermore, the feature of the example parsed file is also calculated as follows:

```
PEFile.resources[2].nsisInfo.opcodes[9]==10
resources_id xor nsisInfo_id xor opcodes_id xor index_hash(9) xor
value_hash(10)
72005311637f58b5 xor 90c42c04143b0ef7 xor 0dc1ad60919ad27e xor
index_hash(9) xor value_hash(10)
```

In some cases, the feature of the example parsed file can also be calculated as follows:

```
    PEFile.imports[3].numberOfFunctions == 13 where
    PEFile.imports[3].dllName == "kernel32.dll"
        imports_id xor objectkey_hash("kernel32.dll") xor
        numberOfFunctions_id == 13.0
            ba7db79509a17f51 xor objectkey_hash("kernel32.dll") xor
        d5f80b084e9780ae == 13.0
```

As shown above, in runtime all feature hashes are constructed by combining pre-determined building block feature identities using XOR operation. A final feature identity may be different based on including or not including XOR operation with index hashes for every collection. In some cases, the order of the resources 230 may not be considered. For example, the concept of order may be an order treating features in hierarchy in a way that makes sense to a model, even if their hierarchical position involves being inside array elements. If all array elements have essentially the same meaning, the individual values of the array elements can be ignored. If the first array element is an image for x86 and the second array element is an image for x64, the individual values of the first and second array elements can be separated and kept, and also the same feature IDs as x86/x64 in all other software samples can be kept. Furthermore, unordering a certain sub-feature tree (e.g., the resources 230) can also be considered. In some cases, an unordered sub-feature tree may include features mapped to the same position in the feature vector 260. Criteria to consider unordering a sub-feature tree include whether a collection of sub-feature trees represents a collection of entities in the original parsed file whose meaning depends on their position in the containing sequence, such that a collection of generic resources would be unordered, and a list of operation codes/machine instructions would stay ordered.

In some cases, a hierarchy processing specifier can be used in identifying features in the parsed file 210. A list of hierarchy processing specifiers includes categorical, continuous, and ObjectKey. The categorical specifier may be default and a hierarchical position in the feature vector 260. The value of categorical specifier would be encoded into a single uint64 value and its presence will be one feature for the model. The continuous specifier may be a hierarchical position of a feature which would be encoded into a uint64 and recorded along with its value converted to real number. Each member of a collection fits into a separate sub-hierarchy based on its index. If it is not present, child nodes of a member of a collection are all processed in the same sub-hierarchy. ObjectKey may be a modifier for processing collections. Each member of a collection fits into a separate sub-hierarchy based on its certain characteristic. If it is not present, child nodes of a member of a collection are all processed in the same sub-hierarchy. For example, no matter what the position in sequence of the imports 220 is for "kernel32.dll", this position is disregarded (e.g., PEFile.imports[3] in the example calculation above), and instead a name (e.g., kernel32.dll) is used as discriminator.

In some cases, a secondary hash can be used in identifying features. The secondary hash takes the same string that is hashed to produce the primary feature name and is used to remove some pieces of information, such as the information related to which thin image the feature is from, and hashes that. The primary and secondary hashes together allow data structure to track independent features, as well as to associate features that are similar but in different images.

In some cases, the feature vector 260 can be used as a single sample input to train a machine learning model. The machine learning model can be trained by taking example parsed file that has identified features as a training input to recognize the identified features. For example, the machine learning model can be trained by feeding a feature vector of a malicious software sample to recognize a malicious software which includes features indicative of maliciousness, such that the trained model can be used to identify malicious components/features in received files to improve security, e.g., when a trained model receives a new input parsed file, the trained model can automatically identify a malicious component/feature in the file and determine that the file might contain a malware. Each feature vector can be used as a training input for a corresponding purpose. In some cases, the operation of determining features in the feature vector 260 can be used in the pre-processing step, e.g., at a training stage. For example, for each training parsed file, a feature vector 260 is determined for the respective file, the feature vector 260 is then used as input for the training operation. For example, a specific feature vector which comprises features identified from certain type of file can be used to train a machine learning model to categorize this type of file based on the features in the feature vector. In some embodiments, for a non-convolutional neural network or non-recurrent neural network, the feature vector 260 discussed herein can allow neural networks to process structural data, e.g, data with sequences of features or sequences of samples/input files, efficiently. Examples of these neural networks include perceptron or multi-layer perceptron, or other neural network that uses the techniques of feedforward with no memory.

Furthermore, at a production stage, for a new input file, the feature vector 260 is determined and then sent to the trained model to determine the outcome. The trained model can generate an output based on the received files to indicate a result/analysis of the files. For example, the trained model may send a notification to another device, e.g., from a server to an endpoint, to indicate that the file is being blocked due to the file being deemed malicious based on its features. In some cases, the trained model may render a user interface output (e.g., on display or sound) to be displayed on the user device to indicate the results of the file.

When processing files with hierarchical data using neural networks, it could be difficult to understand all possible hierarchical features in code. An unforeseen difference in hierarchy would result in abnormal features being ignored in training, such that, prior to training neural networks, additional procedures (e.g., a feature hierarchy discovery) to learn features in their hierarchical positions in the hierarchical data are required and, however, slow computer runtime. In addition, convolutional neural networks are computationally expensive at the runtime processing hierarchical features using convolution operations. Therefore, by flattening hierarchical data, especially a non-convolutional neural network hierarchical data, to establish the feature vector, the feature vector is used to train neural networks, and the trained model can automatically recognize and process features in the files which improves computer performance and is cost-effective.

Figure 3:
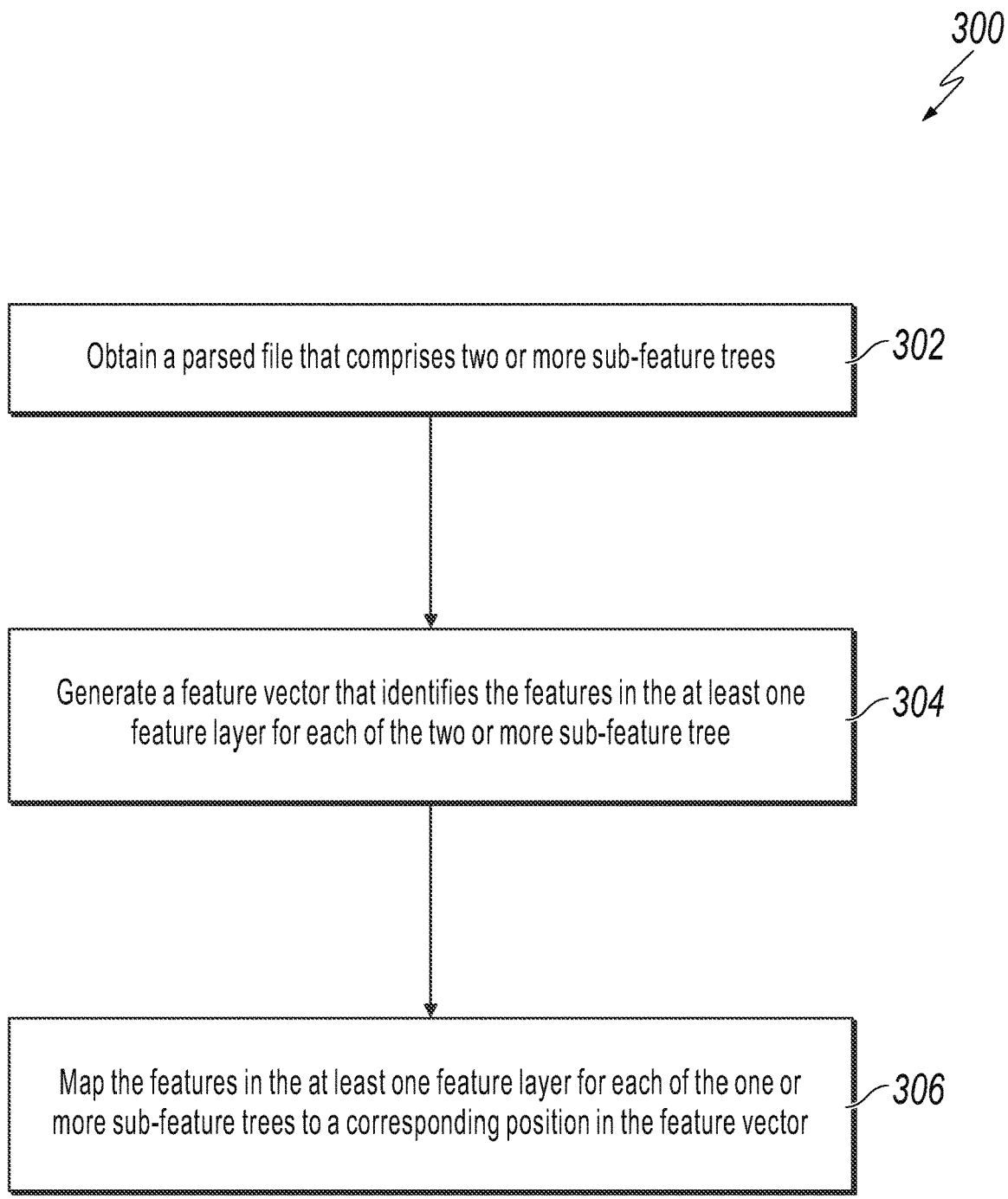
FIG. 3 is a flowchart showing an example method for converting hierarchical data to establish a feature vector, according to an implementation.

FIG. 3 is a flowchart showing an example method 300 for converting hierarchical data into a neural net, according to an implementation. The method 300 can be implemented in a computer, e.g., the user device 120 and the server 150 shown in FIG. 1, for converting hierarchical data. The example method 300 shown in FIG. 3 can be implemented using additional, fewer, or different operations, which can be performed in the order shown or in a different order.

The method 300 provides techniques for converting hierarchical data into a neural net, especially a standard neural net, by de-layering a hierarchy of a file and mapping features of the file to a "flatten" feature vector. By using the feature vector, the method 300 can provide an extensive conversion of data structure to be recognizable in a neural net.

The method 300 starts at step 302 with obtaining a parsed file that comprises two or more sub-feature trees. In some cases, each of the two or more sub-feature trees includes at least one feature layer that comprises features. In some cases, the parsed file includes another parsed file in its sub-feature trees. In some cases, the feature vector can be used as an input for a non-convolutional neural network.

At step 304, the method 300 generates a feature vector that identifies the features in the at least one feature layer for each of the two or more sub-feature trees. In some cases, generating the feature vector further includes delayering the at least one feature layer to identify the features in the at least one feature layer, determining each feature based on a corresponding feature value, and generating a hash value for each feature of the features based on the corresponding feature value. In some cases, generating the feature vector further includes stripping an order of a sub-feature tree of the two or more sub-feature trees, and features identified from the unordered sub-feature tree include the same hash value. In some cases, the hash value may be used as an index in the feature vector. In some cases, the hash value includes an unsigned integer 64 bit value.

At step 306, the method 300 maps the features in the at least one feature layer for each of the one or more sub-feature trees to a corresponding position in the feature vector.

In some cases, the method 300 further includes training a model using the feature vector to identify a specific feature from a software sample.

With reference to the description of FIGS. 1 through 3, the feature vector, as described herein, can provide the following technical effects. The described feature vector techniques can provide a uniform and extensive format for allocating a feature in different software samples. With pre-processing hierarchical data in the files, the hierarchical structure can be de-layered and the features can be identified and mapped to a uniform feature vector. Furthermore, additional pre-processing, such as unordering and removing unnecessary information, for retrieving features from the hierarchical data structure can enhance the accuracy of identifying features. Therefore, the computing performance of a system utilized the enhanced, and errors in reading features can be avoided.

Figure 4:
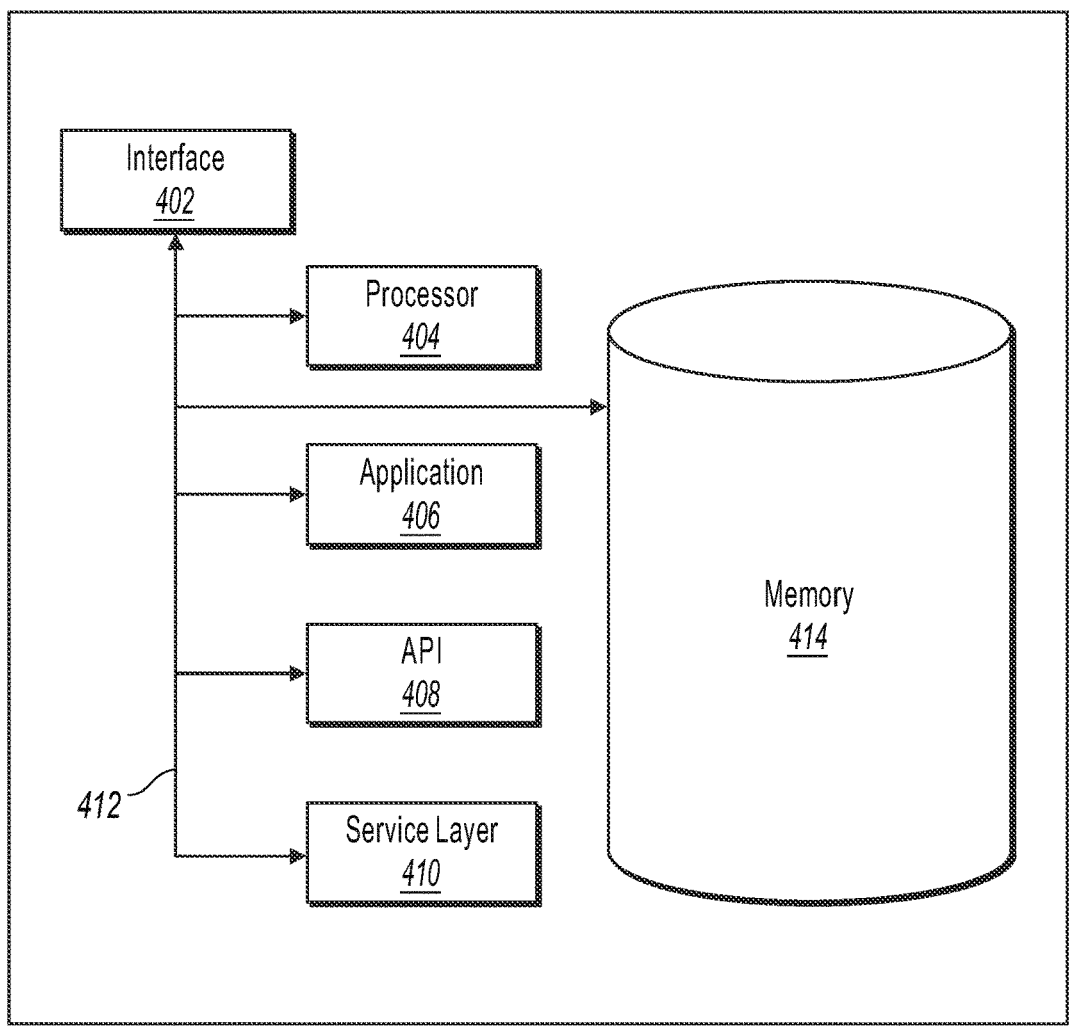
FIG. 4 illustrates a high level architecture block diagram of a server, according to an implementation.

FIG. 4 illustrates a high level architecture block diagram of a computer 400 according to an implementation. The computer 400 can be implemented as the server 150 and/or the endpoint 120 described in FIG. 1. The described illustration is only one possible implementation of the described subject matter and is not intended to limit the disclosure to the single described implementation. Those of ordinary skill in the art will appreciate the fact that the described components can be connected, combined, and/or used in alternative ways consistent with this disclosure.

The computer 400 includes a computing system configured to establish a feature vector by flattening hierarchical data to identify features. In some cases, the computer 400 may include a computing system implementing processes and methods disclosed in FIGS. 1 to 3. In some cases, the processing algorithm for establishing the feature vector can be implemented in an executable computing code, e.g., C/C++ executable codes. In some cases, the computer 400 can include a standalone Linux system that runs batch applications. In some cases, the computer 400 can include mobile or personal computers.

The computer 400 may comprise a computer that includes an input device, such as a keypad, keyboard, touch screen, microphone, speech recognition device, other device that can accept user information, and/or an output device that conveys information associated with the operation of the computer, including digital data, visual and/or audio information, or a GUI.

The computer 400 can serve as a client, network component, a server, a database or other persistency, and/or any other components. In some implementations, one or more components of the computer 400 may be configured to operate within a cloud-computing-based environment.

At a high level, the computer 400 is an electronic computing device operable to receive, transmit, process, store, or manage data. According to some implementations, the computer 400 can also include or be communicably coupled with an application server, e-mail server, web server, caching server, streaming data server, business intelligence (BI) server, and/or other servers.

The computer 400 can establish a feature vector over the network from a client application and/or a third-party application. In addition, the feature vector can be processed by the computer 400 from internal users (e.g., from a command console or by another appropriate access method), external or third parties, other automated applications, as well as any other appropriate entities, individuals, systems, or computers.

Each of the components of the computer 400 can communicate using a system bus 412. In some implementations, any and/or all the components of the computer 400, both hardware and/or software, may interface with each other and/or the interface 402 over the system bus 412 using an application programming interface (API) 408 and/or a service layer 410. The API 408 may include specifications for routines, data structures, and object classes. The API 408 may be either computer language-independent or -dependent and refer to a complete interface, a single function, or even a set of APIs. The service layer 410 provides software services to the computer 400. The functionality of the computer 400 may be accessible for all service consumers using this service layer. Software services, such as those provided by the service layer 410, provide reusable, defined business functionalities through a defined interface. For example, the interface may be software written in JAVA, C++, or other suitable languages providing data in Extensible Markup Language (XML) format or other suitable format. While illustrated as an integrated component of the computers 400, alternative implementations may illustrate the API 408 and/or the service layer 410 as stand-alone components in relation to other components of the computer 400. Moreover, any or all parts of the API 408 and/or the service layer 410 may be implemented as child or sub-modules of another software module, enterprise application, or hardware module without departing from the scope of this disclosure.

The computer 400 includes an interface 402. Although illustrated as a single interface 402 in FIG. 4, two or more interfaces 402 may be used according to particular needs, desires, or particular implementations of the computer 400. The interface 402 is used by the computer 400 for communicating with other systems in a distributed environment connected to a network (whether illustrated or not). Generally, the interface 402 comprises logic encoded in software and/or hardware in a suitable combination and operable to communicate with the network. More specifically, the interface 402 may comprise software supporting one or more communication protocols associated with communications such that the network or interface's hardware is operable to communicate physical signals within and outside of the computer 400.

The computer 400 includes at least one processor 404. Although illustrated as a single processor 404 in FIG. 4, two or more processors may be used according to particular needs, desires, or particular implementations of the server. Generally, the processor 404 executes instructions and manipulates data to perform the operations of the computer 400. Specifically, the processor 404 executes the functionality required for establishing a feature vector disclosed in FIGS. 1 to 3.

The computer 400 also includes a memory 414 that holds data for the computer 400. Although illustrated as a single memory 414 in FIG. 4, two or more memories may be used according to particular needs, desires, or particular implementations of the computer 400. While memory 414 is illustrated as an integral component of the computer 400, in alternative implementations, memory 414 can be external to the computer 400.

The application 406 is an algorithmic software engine providing functionality according to particular needs, desires, or particular implementations of the computer 400, particularly with respect to the functionality required for anomaly detection. Although illustrated as a single application 406, the application 406 may be implemented as multiple applications 406 on the computer 400. In addition, although illustrated as integral to the computer 400, in alternative implementations, the application 406 can be external to the computer 400.

There may be any number of the computer 400 associated with, or external to, and communicating over a network. Further, this disclosure contemplates that many users may use one computer 400, or that one user may use multiple computers 400.

Figure 5:
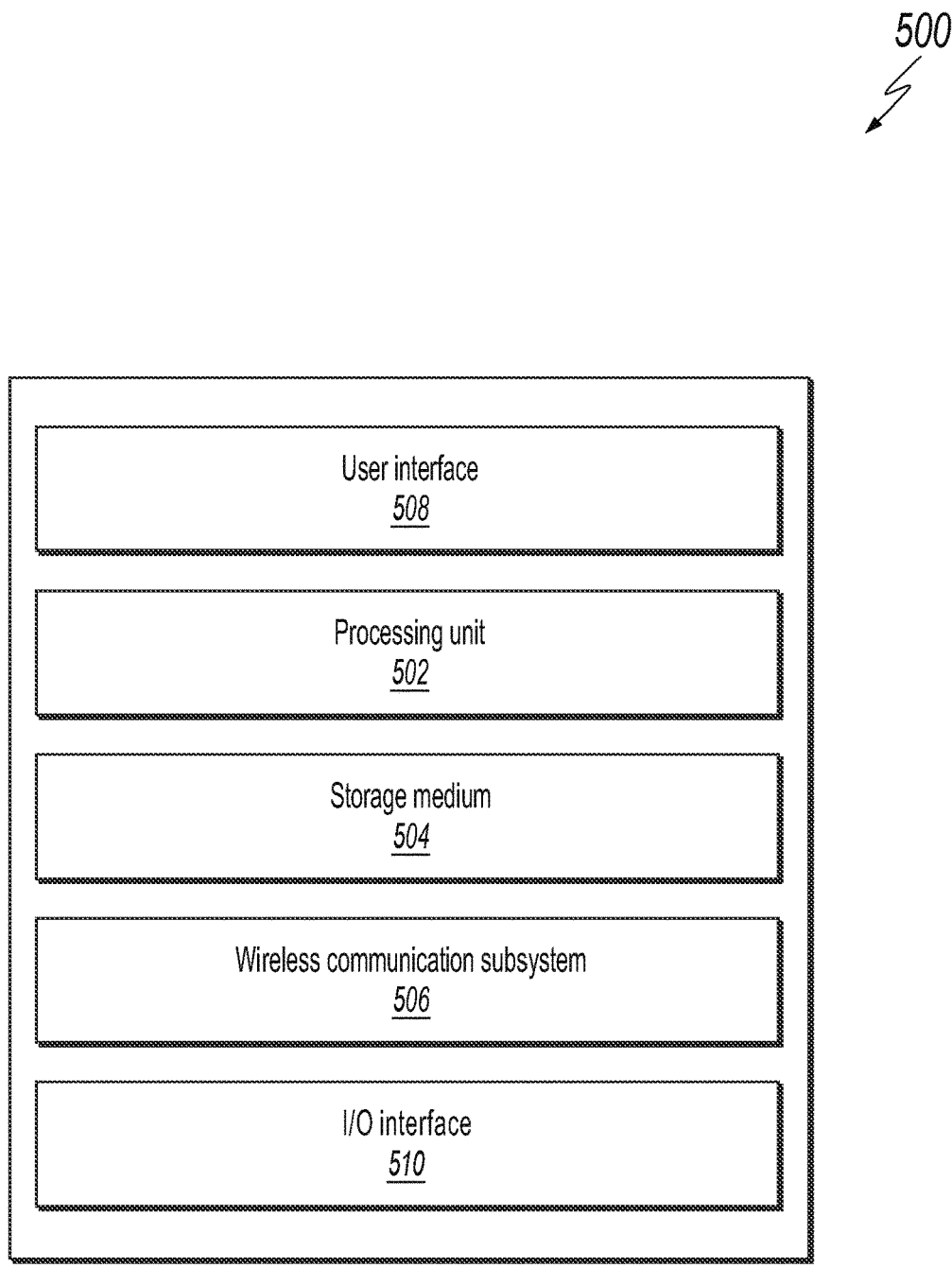
FIG. 5 is a block diagram illustrating an example user device, according to an implementation.

FIG. 5 is a block diagram illustrating an example user device 500 according to an implementation. The example user device 500 can be implemented as the user devices described in FIG. 1. The described illustration is only one possible implementation of the described subject matter and is not intended to limit the disclosure to the single described implementation. Those of ordinary skill in the art will appreciate the fact that the described components can be connected, combined, and/or used in alternative ways consistent with this disclosure.

The illustrated device 500 includes a processing unit 502, a computer-readable storage medium 504 (for example, read-only memory (ROM) or flash memory), a wireless communication subsystem 506, a user interface 508, and an I/O interface 510.

The processing unit 502 can include one or more processing components (alternatively referred to as "processors" or "central processing units" (CPUs)) configured to execute instructions related to one or more of the processes, steps, or actions described herein in connection with one or more of the implementations disclosed herein. In some implementations, the processing unit 502 may be configured to generate control information, such as a measurement report, or to respond to received information, such as control information from a network node. The processing unit 502 may also be configured to make a Radio Resource Management (RRM) decision such as cell selection/reselection information, or trigger a measurement report. The processing unit 502 can also include other auxiliary components, such as random access memory (RAM) and ROM.

The computer-readable storage medium 504 can store an operating system (OS) of the endpoint and various other computer-executable instructions, logic or software programs for performing one or more of the processes, steps, or actions described above. In some cases, the computer-readable storage medium 504 can be transitory, non-transitory, or a combination thereof.

The wireless communication subsystem 506 may be configured to provide wireless communication for voice, data, and/or control information provided by the processing unit 502. The wireless communication subsystem 506 can include, for example, one or more antennas, a receiver, a transmitter, a local oscillator, a mixer, and a DSP unit. In some implementations, the wireless communication subsystem 506 can support MIMO transmissions. In some implementations, the receiver in the wireless communication subsystems 506 can be an advanced receiver or a baseline receiver. Two receivers can be implemented with identical, similar, or different receiver processing algorithms.

The user interface 508 can include, for example, one or more of a screen or touch screen (for example, a liquid crystal display (LCD), a light emitting display (LED), an organic light emitting display (OLED), a micro-electromechanical system (MEMS) display), a keyboard or keypad, a trackball, a speaker, and a microphone. The I/O interface 510 can include, for example, a universal serial bus (USB) interface.

Implementations of the subject matter and the functional operations described in this specification can be implemented in digital electronic circuitry, intangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

Described implementations of the subject matter can include one or more features, alone or in combination.

For example, in a first implementation, a method, comprising: obtaining a parsed file that comprises two or more sub-feature trees, wherein each of the two or more sub-feature trees comprise at least one feature layer that comprises features, generating a feature vector that identifies the features in the at least one feature layer for each of the two or more sub-feature trees, and mapping the features in the at least one feature layer for each of the one or more sub-feature trees to a corresponding position in the feature vector.

The foregoing and other described implementations can each, optionally, include one or more of the following features:

A first feature, combinable with any of the following features, wherein generating the feature vector comprises delayering the at least one feature layer to identify the features in the at least one feature layer, determining each feature based on a corresponding feature value, and generating a hash value for each feature of the features based on the corresponding feature value.

A second feature, combinable with any of the foregoing and following features, wherein generating the feature vector further comprises stripping an order of a sub-feature tree of the two or more sub-feature trees, wherein features identified from the unordered sub-feature tree comprises the same hash value.

A third feature, combinable with any of the foregoing and following features, wherein the hash value is used as an index in the feature vector.

A fourth feature, combinable with any of the foregoing and following features, wherein the hash value comprises an unsigned integer 64 bit value.

A fifth feature, combinable with any of the foregoing and following features, wherein the feature vector is used as an input for a non-convolutional neural network.

A sixth feature, combinable with any of the foregoing and following features, further comprising training a model using the feature vector to process the features consistently across different software samples.

In a second implementation, a computer-readable medium containing instructions which, when executed, cause a computing device to perform operations comprising: obtaining a parsed file that comprises two or more sub-feature trees, wherein each of the two or more sub-feature trees comprise at least one feature layer that comprises features, generating a feature vector that identifies the features in the at least one feature layer for each of the two or more sub-feature trees, and mapping the features in the at least one feature layer for each of the one or more sub-feature trees to a corresponding position in the feature vector.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: obtaining a parsed file that comprises two or more sub-feature trees, wherein each of the two or more sub-feature trees comprise at least one feature layer that comprises features, generating a feature vector that identifies the features in the at least one feature layer for each of the two or more sub-feature trees, and mapping the features in the at least one feature layer for each of the one or more sub-feature trees to a corresponding position in the feature vector.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatus with or without conventional operating systems, for example, LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, subprograms, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers, executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a ROM, RAM, or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a PDA, a mobile audio or video player, a game console, a GPS receiver, or a portable storage device, e.g., a USB flash drive, to name just a few.

Computer readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD, LED, or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., such as a data server, or that includes a middleware component, e.g., an application server, or that includes a front-end component, e.g., a client computer having a graphical user interface or a Web browser through which a user can interact with an implementation of the subject matter described in this specification, or any combination of one or more such back end, middleware, or front end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a WLAN using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship with each other.

In some implementations, any or all of the components of the computing system, both hardware and/or software, may interface with each other and/or the interface using an API and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in XML format or other suitable formats. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or package into multiple software products.

Accordingly, the above description of example implementations does not define or constrain this disclosure. Other changes, substitutions, and alterations are also possible without departing from the spirit and scope of this disclosure.

What is claimed is:

1. A computer-implemented method, comprising:
obtaining a parsed file that comprises two or more sub-feature trees, wherein each of the two or more sub-feature trees comprise at least one feature layer that comprises features, wherein the parsed file is a portable executable file;
generating a feature vector that identifies the features in the at least one feature layer for each of the two or more sub-feature trees;
mapping the features in the at least one feature layer for each of the one or more sub-feature trees to a corresponding position in the feature vector;
processing the parsed file by providing the feature vector to a non-convolutional neural network;
identifying an input file that contains a malicious feature by using a machine learning model that is trained based on the feature vector; and
blocking the input file in response to identifying the input file that contains the malicious feature by using the machine learning model.

2. The computer-implemented method of claim 1, wherein generating the feature vector comprises:
delayering the at least one feature layer to identify the features in the at least one feature layer;
determining each feature based on a corresponding feature value; and
generating a hash value for each feature of the features based on the corresponding feature value.

3. The computer-implemented method of claim 2, wherein generating the feature vector further comprises stripping an order of a sub-feature tree of the two or more sub-feature trees, wherein features identified from the unordered sub-feature tree comprise the same hash value.

4. The computer-implemented method of claim 2, wherein the hash value is used as an index in the feature vector.

5. The computer-implemented method of claim 2, wherein the hash value comprises an unsigned integer 64 bit value.

6. A non-transitory computer-readable medium containing instructions which, when executed, cause a computing device to perform operations comprising:
obtaining a parsed file that comprises two or more sub-feature trees, wherein each of the two or more sub-feature trees comprise at least one feature layer that comprises features, wherein the parsed file is a portable executable file;
generating a feature vector that identifies the features in the at least one feature layer for each of the two or more sub-feature trees;
mapping the features in the at least one feature layer for each of the one or more sub-feature trees to a corresponding position in the feature vector;
processing the parsed file by providing the feature vector to a non-convolutional neural network;
identifying an input file that contains a malicious feature by using a machine learning model that is trained based on the feature vector; and
blocking the input file in response to identifying the input file that contains the malicious feature by using the machine learning model.

7. The computer-readable medium of claim 6, wherein generating the feature vector comprises:
delayering the at least one feature layer to identify the features in the at least one feature layer;
determining each feature based on a corresponding feature value; and
generating a hash value for each feature of the features based on the corresponding feature value.

8. The computer-readable medium of claim 7, wherein generating the feature vector further comprises stripping an order of a sub-feature tree of the two or more sub-feature trees, wherein features identified from the unordered sub-feature tree comprises the same hash value.

9. The computer-readable medium of claim 7, wherein the hash value is used as an index in the feature vector.

10. The computer-readable medium of claim 7, wherein the hash value comprises an unsigned integer 64 bit value.

11. A computer-implemented system, comprising:
one or more computers; and
one or more computer memory devices interoperably coupled with the one or more computers and having tangible, machine-readable media storing one or more instructions that, when executed by the one or more computers, perform one or more operations comprising:
obtaining a parsed file that comprises two or more sub-feature trees, wherein each of the two or more sub-feature trees comprise at least one feature layer that comprises features, wherein the parsed file is a portable executable file;
generating a feature vector that identifies the features in the at least one feature layer for each of the two or more sub-feature trees;
mapping the features in the at least one feature layer for each of the one or more sub-feature trees to a corresponding position in the feature vector;
processing the parsed file by providing the feature vector to a non-convolutional neural network;
identifying an input file that contains a malicious feature by using a machine learning model that is trained based on the feature vector; and
blocking the input file in response to identifying the input file that contains the malicious feature by using the machine learning model.

12. The computer-implemented system of claim 11, wherein generating the feature vector comprises:
delayering the at least one feature layer to identify the features in the at least one feature layer;
determining each feature based on a corresponding feature value; and generating a hash value for each feature of the features based on the corresponding feature value.

13. The computer-implemented system of claim 12, wherein generating the feature vector further comprises stripping an order of a sub-feature tree of the two or more sub-feature trees, wherein features identified from the unordered sub-feature tree comprises the same hash value.

14. The computer-implemented system of claim 12, wherein the hash value is used as an index in the feature vector.

15. The computer-implemented system of claim 12, wherein the hash value comprises an unsigned integer 64 bit value.

\* \* \* \* \*